United States Patent
Tsuneyama et al.

(10) Patent No.: US 8,944,495 B2
(45) Date of Patent: Feb. 3, 2015

(54) FENDER PANEL MOUNTING STRUCTURE

(75) Inventors: Teppei Tsuneyama, Nagoya (JP); Katsuya Inoue, Nisshin (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 14/129,114

(22) PCT Filed: Jun. 5, 2012

(86) PCT No.: PCT/JP2012/064479
§ 371 (c)(1),
(2), (4) Date: Dec. 24, 2013

(87) PCT Pub. No.: WO2013/008560
PCT Pub. Date: Jan. 17, 2013

(65) Prior Publication Data
US 2014/0138986 A1 May 22, 2014

(30) Foreign Application Priority Data

Jul. 11, 2011 (JP) ................................ 2011-152927

(51) Int. Cl.
*B60N 99/00* (2006.01)
*B62D 25/16* (2006.01)
*B60R 21/34* (2011.01)

(52) U.S. Cl.
CPC .............. *B62D 25/16* (2013.01); *B62D 25/163* (2013.01); *B60R 21/34* (2013.01); *B60R 2021/343* (2013.01)
USPC ................................. 296/193.09; 296/203.02

(58) Field of Classification Search
USPC ............................ 296/187.09, 193.09, 203.02
See application file for complete search history.

(56) References Cited

U.S. PATENT DOCUMENTS

| 6,612,644 | B2 * | 9/2003 | Ahn ........................... 296/187.04 |
| 8,403,391 | B2 * | 3/2013 | Steinhilb et al. ................. 296/29 |
| 2002/0063443 | A1 * | 5/2002 | Lee .............................. 296/198 |

FOREIGN PATENT DOCUMENTS

| JP | A-2005-14763 | 1/2005 |
| JP | A-2008-137540 | 6/2008 |
| JP | A-2008-254861 | 10/2008 |
| JP | A-2010-195193 | 9/2010 |

* cited by examiner

*Primary Examiner* — Lori L Lyjak
(74) *Attorney, Agent, or Firm* — Oliff PLC

(57) ABSTRACT

A front fender panel and an apron upper member are connected via an impact absorbing bracket. The impact absorbing bracket has a first supporting leg portion and a second supporting leg portion that form an angle with one another as seen from a vehicle vertical direction. The first supporting leg portion and the second supporting leg portion are connected, via a connecting portion, further toward a vehicle lower side than a fender panel mounting portion.

11 Claims, 17 Drawing Sheets

US 8,944,495 B2

FENDER PANEL MOUNTING STRUCTURE

TECHNICAL FIELD

The present invention relates to a fender mounting structure that mounts an upper portion inner side end portion of a fender panel for a vehicle to a vehicle body side structural member via an impact absorbing bracket.

BACKGROUND ART

A technique of mounting the upper end inner side portion of a fender panel to an upper end horizontal portion of an apron upper member via a fender bracket is disclosed in FIG. 15 of Japanese Patent Application Laid-Open No. 2008-137540. This fender bracket is formed in a substantial hat shape as seen from the side of the vehicle, and further, a folded portion (ridgeline) is formed at the intermediate portion in the height direction thereof.

In accordance with the fender bracket of the above-described structure, in a case in which a collision body collides from the vehicle upper side with a parting portion between the fender panel and the hood, the fender bracket bendingly-deforms at the folded portion and can absorb the impact, and a good pedestrian protecting performance can be obtained.

DISCLOSURE OF INVENTION

Technical Problem

However, at the fender bracket of the above-described structure, in order to make the folded portion of a supporting leg portion be the starting point of deformation at the time of input of a collision load, a weak portion is formed at the folded portion. Therefore, the rigidity in the deforming direction of this folded portion in particular is low, and it is difficult to increase the fitting rigidity of the upper portion inner side end portion of the fender panel.

In consideration of the above-described circumstances, an object of the present invention is to obtain a fender panel mounting structure that ensures a pedestrian protecting performance by causing a folded portion, that is formed at an intermediate portion in the height direction, to bendingly-deform and carries out absorption of collision load, and that can also ensure the fitting rigidity of a fender panel.

Solution to Problem

A fender panel mounting structure relating to a first aspect of the present invention comprises: an upper portion inner side end portion of a fender panel that is disposed at a vehicle body front portion side surface; a vehicle body side structural member that is disposed further toward a vehicle lower side than the upper portion inner side end portion of the fender panel, and that is a mounting mate of with the fender panel; and an impact absorbing bracket having a fender panel mounting portion at which the upper portion inner side end portion is mounted, a vehicle body mounting base portion that is mounted at the vehicle body side structural member, a pair of supporting leg portions that are plate-shaped, and that connect the fender panel mounting portion and the vehicle body mounting base portion in a vehicle vertical direction, and at which are formed folded portions that are folded over from one end to another end at height direction intermediate portions of the respective supporting leg portions, and that are disposed such that plate surfaces thereof form an angle as seen from the vehicle vertical direction, and a connecting portion that connects the pair of supporting leg portions to one another further toward a vehicle lower side than the fender panel mounting portion, the impact absorbing bracket deforming and absorbing energy due to input of collision load from a vehicle upper side.

At the impact absorbing bracket relating to the present invention, the upper end side mounting portion of the fender panel is mounted to the fender panel mounting portion, and the vehicle body mounting base portion is mounted to the vehicle body side structural member. Further, the pair of supporting leg portions connect the fender panel mounting portion and the vehicle body mounting base portion in the vehicle vertical direction. Note that, here, connect may be not only direct connection, but also indirect connection via another portion. Folded portions (ridgelines), that are folded over from one end to the other end at the height direction intermediate portions of the respective supporting leg portions, are formed at the pair of supporting leg portions. Further, the pair of supporting leg portions are disposed such that the plate surfaces thereof form an angle as seen from the vehicle vertical direction. Further, the pair of supporting leg portions are connected to one another via a connecting portion, further toward the vehicle lower side than the fender panel mounting portion.

The upper end side mounting portion of the fender panel is mounted at the vehicle body side structural member via the impact absorbing bracket. Due to input of collision load from the vehicle upper side, the impact absorbing bracket deforms, with the folded portions being the starting point, and absorbs energy.

In the present invention, due to the plate surfaces of the pair of supporting leg portions forming an angle, the section modulus is large as compared with a case in which the plate surfaces do not form an angle, i.e., a case in which the plate surfaces are disposed flush as seen from the vehicle vertical direction. Accordingly, deformation in the out-of-plane direction is suppressed, and the fitting rigidity of the fender panel can be increased. Moreover, by having the connecting portion further toward the vehicle lower side than the fender panel mounting portion, the fitting rigidity of the fender panel can be increased as compared with a case not having this connecting portion.

In a fender panel mounting structure relating to a second aspect of the present invention, in the fender panel mounting structure relating to claim 1, an opening portion, that spans between the folded portions in the vehicle vertical direction, is structured between the pair of supporting leg portions.

In accordance with the fender panel mounting structure relating to the second aspect, the portions, that are adjacent to the opening portion, of the pair of supporting leg portions are apart from one another. Therefore, as compared with a case in which there is no opening portion, the deformation load of the portions corresponding to this opening portion can be lowered. Accordingly, in a case in which there is input of collision load from the vehicle upper side, deformation of the respective folded portions can be started smoothly.

In a fender panel mounting structure relating to a third aspect of the present invention, in the fender panel mounting structure relating to the second aspect, the vehicle body mounting base portion is formed by end portions, at a side opposite the fender panel mounting portion, of the pair of supporting leg portions being extended while being bent, and the opening portion is extended so as to span between the bent portions that are bent.

In accordance with the fender panel mounting structure relating to the third aspect, the pair of supporting leg portions are apart from one another from the upper end of the opening portion to the positions spanning the bent portions that are disposed at the boundary with the vehicle body mounting base portion. Therefore, in a case in which there is input of collision load from the vehicle upper side, the respective folded portions and bent portions can be deformed independently. Namely, the deformations of the respective supporting leg portions, in which the starting points are the folded portions and the bent portions, proceed without interfering with one another. Due thereto, even if the specifications of the shape of the impact absorbing bracket are changed accompanying the shape designs of fender panels differing in accordance with vehicle types, a deterioration in the energy absorbing performance (pedestrian protecting performance) can be suppressed while the fitting rigidity is maintained.

In a fender panel mounting structure relating to a fourth aspect of the present invention, in the fender panel mounting structure relating to the third aspect, the vehicle body mounting base portion is divided by the opening portion into a first vehicle body mounting base portion that is extended from one of the pair of supporting leg portions and a second vehicle body mounting base portion that is extended from another.

In accordance with the fender panel mounting structure relating to the fourth aspect, one of the pair of supporting leg portions and the first vehicle body mounting base portion, and the other of the pair of supporting leg portions and the second vehicle body mounting base portion, are apart from one another across the opening portion. Therefore, each can be mounted independently to the vehicle body side structural member, and assembly can be carried out easily.

In a fender panel mounting structure relating to the present invention of a fifth aspect, the fender panel mounting portion is hexagonal plate shaped, and the pair of supporting leg portions are connected to two adjacent sides.

In accordance with the fender panel mounting structure relating to the fifth aspect, the pair of supporting leg portions can be connected easily by utilizing two sides of the fender panel mounting portion that is hexagonal plate shaped.

Advantageous Effects of Invention

As described above, the fender panel mounting structure relating to the present invention of the first aspect has the excellent effect that, as compared with a case in which the folded portions do not form an angle, the fitting rigidity of the fender panel can be increased, and, as compared with a case that does not have a connecting portion further toward the vehicle lower side than the fender panel mounting portion, the mounting rigidity of the fender panel can be increased.

The fender panel mounting structure relating to the present invention of the second aspect has the excellent effect that the deformation load can be reduced, and the deformation of each folded portion can be started smoothly.

The fender panel mounting structure relating to the present invention of the third aspect also has the excellent effect that, because the respective folded portions and bent portions can be deformed independently, deformations of the respective supporting leg portions, in which the starting points are the folded portions and the bent portions, proceed without interfering with one another, and even if the shape of the impact absorbing bracket is changed accompanying the shapes of fender panels differing in accordance with vehicle types, a deterioration in the energy absorbing performance (pedestrian protecting performance) can be suppressed while the fitting rigidity is maintained.

The fender panel mounting structure relating to the present invention of the fourth aspect has the excellent effect that one of the pair of supporting leg portions and the first vehicle body mounting base portion, and the other of the pair of supporting leg portions and the second vehicle body mounting base portion, can respectively be mounted independently to the vehicle body side structural member, and assembly can be carried out easily.

The fender panel mounting structure relating to the present invention of the fifth aspect has the feature that the fender panel mounting portion is made to be hexagonal plate shaped, and the pair of supporting leg portions are connected to adjacent two sides.

DESCRIPTION OF EMBODIMENTS

First Embodiment

Figure 1:
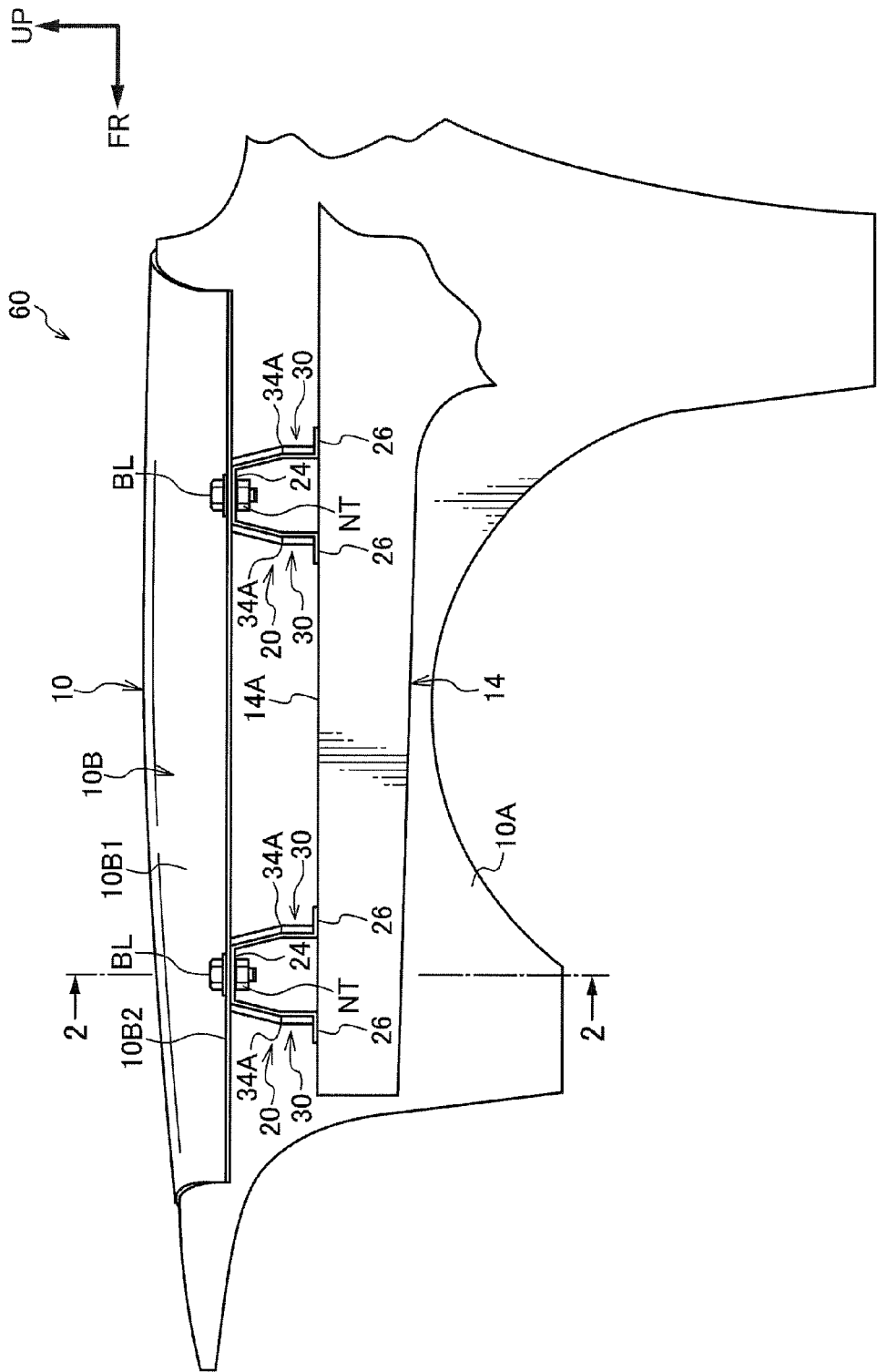
FIG. 1 is a side view viewing, from an engine room side, a fender panel mounting structure relating to a first embodiment of the present invention.

A first embodiment of a fender panel mounting structure relating to the present invention is described hereinafter by using FIG. 1 through FIG. 4. Note that arrow FR shown appropriately in the drawings indicates the vehicle front side, arrow UP indicates the vehicle upper side, and arrow OUT indicates the vehicle transverse direction outer side.

Figure 2:
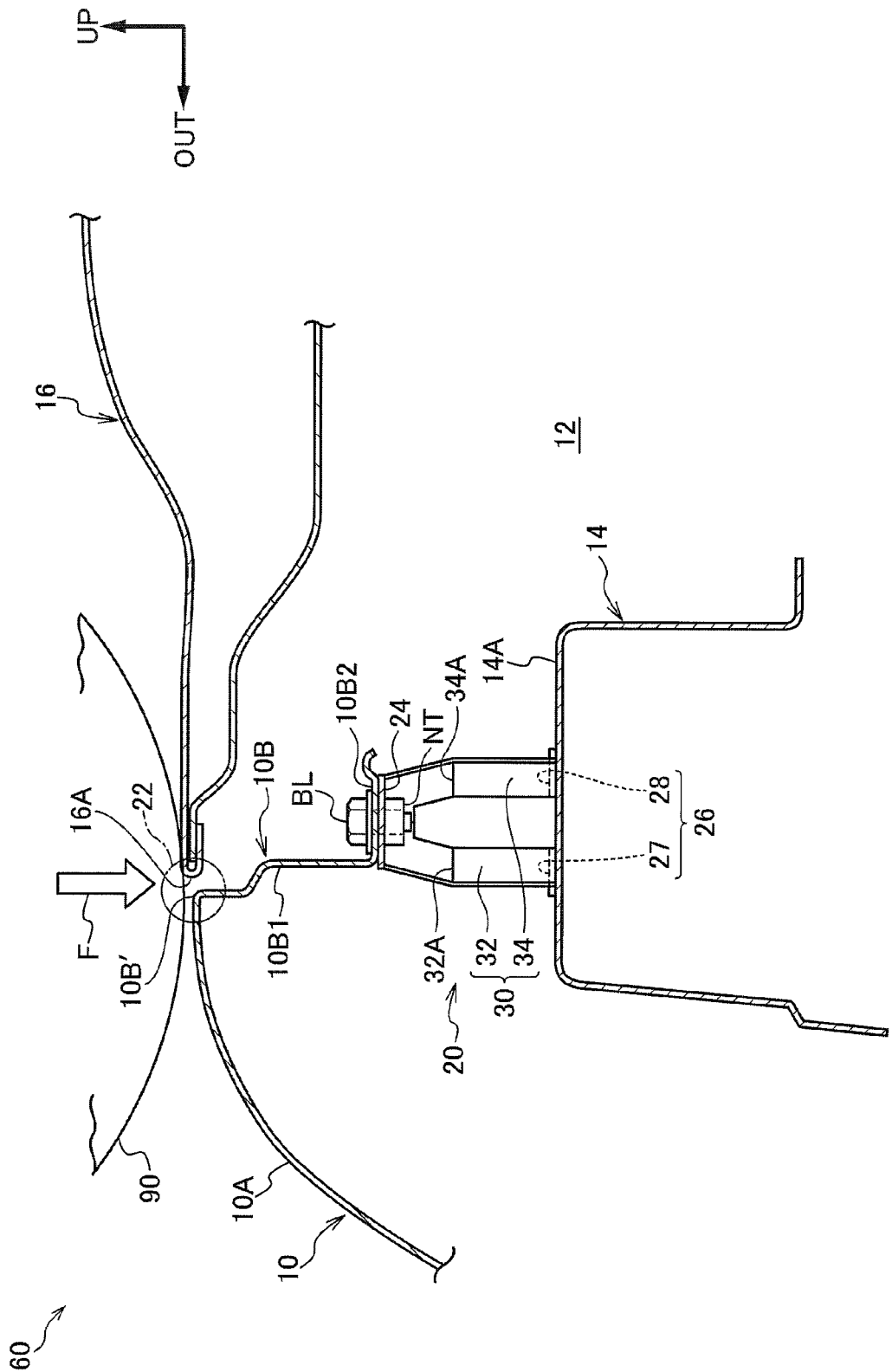
FIG. 2 is a vertical sectional view along line 2-2 of FIG. 1, showing the fender panel mounting structure relating to the first embodiment of the present invention as seen from a vehicle front side.

A side view, in which a fender panel mounting structure 60 relating to the present embodiment is viewed from the inner side of an engine room, is shown in FIG. 1. Further, a vertical sectional view, in which a state in which this fender panel mounting structure 60 is cut along the vehicle transverse direction is viewed from the vehicle front side, is shown in FIG. 2. As shown in these drawings, a front fender panel 10 is disposed at the side surface of a vehicle body front portion. The front fender panel 10 is structured to include an outer side vertical wall portion 10A that covers the upper side of a front wheel and structures the design surface, and an inner side vertical wall portion 10B that serves as an upper portion inner side end portion and that hangs down from the upper end portion of this outer side vertical wall portion 10A and is bent (extended) toward an engine room 12 side.

An apron upper member 14 that serves as a vehicle body side structural member is disposed beneath the inner side vertical wall portion 10B of the front fender panel 10. The apron upper member 14 is a vehicle body skeleton member that is elongated and has a substantially U-shaped cross-section that opens downward, and is extended along the vehicle longitudinal direction.

A hood 16 (see FIG. 2), that structures the vehicle body front portion upper surface and that opens and closes the engine room 12, is disposed between the upper end portions of the inner side vertical wall portions 10B of the pair of left and right front fender panels 10. An unillustrated sealing material that is structured by an elastic material (e.g., rubber) is disposed at the lower edge side of a transverse direction outer end portion 16A of the hood 16, and seals a parting portion 22 between an upper end portion 10B' of the inner side vertical wall portion 10B of the front fender panel 10 and the transverse direction outer end portion 16A of the hood 16.

The inner side vertical wall portion 10B of the front fender panel 10 is mounted to a top wall portion 14A that is the upper surface of the apron upper member 14, via plural impact absorbing brackets 20 that are disposed at a predetermined interval in the vehicle longitudinal direction. The impact absorbing bracket 20 is formed in a substantial hat shape as seen from the vehicle side surface, and has a fender panel mounting portion 24, a vehicle body mounting base portion 26, and pairs of supporting leg portions 30. In the present embodiment, the vehicle body mounting base portion 26 is structured by a first vehicle body mounting base portion 27 and a second vehicle body mounting base portion 28, and the pair of supporting leg portions 30 is structured by a first supporting leg portion 32 and a second supporting leg portion 34. Further, in the present embodiment, the pairs of supporting leg portions 30 are disposed respectively at the vehicle front side and rear side with the fender panel mounting portion 24 disposed therebetween, and there are two pairs of the supporting leg portions 30.

Figure 3:
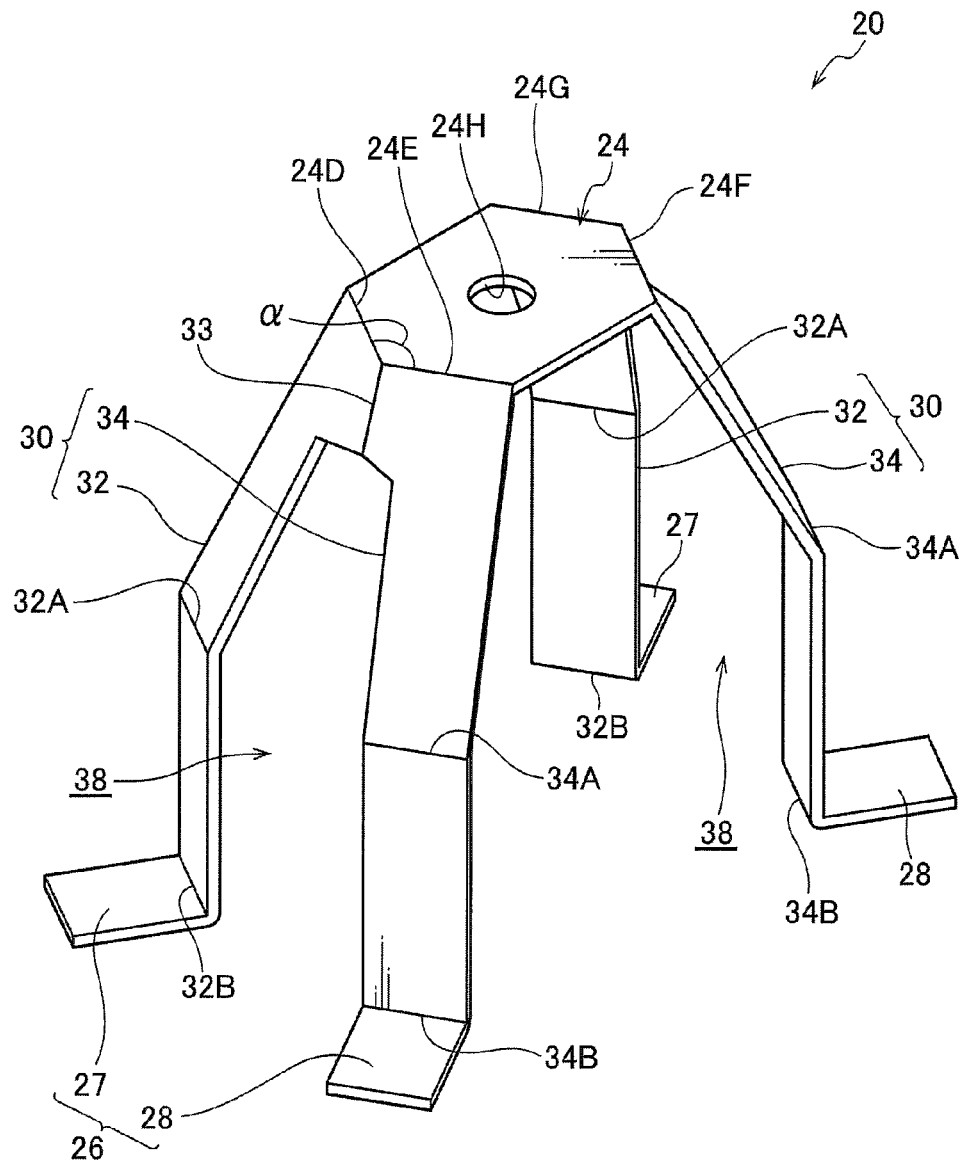
FIG. 3 is a perspective view showing an impact absorbing bracket in the first embodiment of the present invention.

As shown in FIG. 3, the fender panel mounting portion 24 of the impact absorbing bracket 20 is formed in a hexagonal plate shape, and a bolt insert-through hole 24H is formed in the central portion thereof. Note that the fender panel mounting portion 24 may be a polygonal shape other than a hexagonal plate shape. In a state in which the fender panel mounting portion 24 is disposed parallel to the top wall portion 14A of the apron upper member 14 and a horizontal portion 10B2 of the inner side vertical wall portion 10B of the front fender panel 10 is placed on the upper surface of the fender panel mounting portion 24, the inner side vertical wall portion 10B of the front fender panel 10 is mounted. Mounting here is carried out by a bolt BL being inserted-in from the upper side of the horizontal portion 10B2 and being screwed-together with a nut NT that is at the lower surface side. Note that weld nuts may be fixed in advance at positions corresponding to the nuts.

As shown in FIG. 3, as seen from the vehicle vertical direction, the pairs of supporting leg portions 30 are extended from two adjacent end sides 24D, 24E of the fender panel mounting portion 24. The pair of supporting leg portions 30 is structured by the pair of the first supporting leg portion 32 and the second supporting leg portion 34. The first supporting leg portion 32 is plate-shaped, and is extended toward the top wall portion 14A side of the apron upper member 14 from the one end side 24D. A folded portion 32A is formed at the intermediate portion in the height direction of the first supporting leg portion 32. The folded portion 32A is formed by folding the intermediate portion of the first supporting leg portion 32 from one end of the first supporting leg portion 32 to the other end as seen from the vehicle vertical direction, such that the intermediate portion becomes convex in a direction of moving away from the fender panel mounting portion 24.

The second supporting leg portion 34 is plate-shaped, and is extended toward the top wall portion 14A side of the apron upper member 14 from the other end side 24E. A folded portion 34A is formed at the intermediate portion in the height direction of the second supporting leg portion 34. In the same way as the folded portion 32A, the folded portion 34A is formed by folding the intermediate portion of the second supporting leg portion 34 from one end of the second supporting leg portion 34 to the other end as seen from the vehicle vertical direction, such that the intermediate portion becomes convex in a direction of moving away from the fender panel mounting portion 24.

The first supporting leg portion 32 and the second supporting leg portion 34 are connected via a connecting portion 33, at the vehicle lower side from the fender panel mounting portion 24. The connecting portion 33 is structured by a fold line in the vertical direction (the vehicle vertical direction) that is formed between the first supporting leg portion 32 and the second supporting leg portion 34. The connecting portion 33 is set further toward the vehicle upper side than the folded portions 32A, 34A. An angle α formed by the first supporting leg portion 32 and the second supporting leg portion 34 is set within the range of 90°≤α<180°.

An opening portion 38 is formed at the vehicle lower side from the connecting portion 33, between the first supporting leg portion 32 and the second supporting leg portion 34. The opening portion 38 reaches to the portion that corresponds to a bent portion 32B and a bent portion 34B, that is the boundary portion with the vehicle body mounting base portion 26 that is described later, and separates the apron upper member 14 sides of the first supporting leg portion 32 and the second supporting leg portion 34. It suffices for the length in the vehicle transverse direction of the opening portion 38 to be greater than 0, and the length is set in accordance with the required rigidity and energy absorbing performance (pedestrian protecting performance).

The first vehicle body mounting base portion 27 is connected to the vehicle lower side distal end of the first supporting leg portion 32. The first vehicle body mounting base portion 27 is extended integrally from the first supporting leg portion 32, and is bent so as to be in a state of planarly-contacting the top wall portion 14A of the apron upper member 14 (hereinafter, this bent portion is called the "bent portion 32B"), and is fixed to the top wall portion 14A by spot welding or the like.

The second vehicle body mounting base portion 28 is connected to the vehicle lower side distal end of the second supporting leg portion 34. The second vehicle body mounting base portion 28 is extended integrally from the second supporting leg portion 34, and is bent so as to be in a state of planarly-contacting the top wall portion 14A of the apron upper member 14 (hereinafter, this bent portion is called the "bent portion 34B"), and is fixed to the top wall portion 14A by spot welding or the like. The first vehicle body mounting base portion 27 and the second vehicle body mounting base portion 28 are separated so as to be independent of one another, and are disposed apart from one another.

The members from the first supporting leg portion 32, that has the same structure as described above, to the first vehicle body mounting base portion 27, the second supporting leg portion 34, the second vehicle body mounting base portion 28 and the connecting portion 33 are connected also to end sides 24F, 24G that oppose the two end sides 24D, 24E of the fender panel mounting portion 24. The first supporting leg portion 32 and the second supporting leg portion 34 that are connected to the end sides 24D, 24E, and the first supporting leg portion 32 and the second supporting leg portion 34 that are connected to the end sides 24F, 24G, are symmetric across the fender panel mounting portion 24, and are disposed in substantial V-shapes as seen from the vehicle side surface (so as to extend in directions of moving away from one another toward the vehicle lower side).

The impact absorbing bracket 20 is made of metal, and the fender panel mounting portion 24, the first supporting leg portions 32, the second supporting leg portions 34, the connecting portions 33, the first vehicle body mounting base portions 27 and the second vehicle body mounting base portions 28 can be formed integrally from a single plate by press working. Note that the impact absorbing bracket 20 does not have to be formed integrally by press working, and may be structured by another method, for example, by bending punched-out plates and connecting them by welding or the like.

Operation and effects of the above-described embodiment are described next.

As shown in FIG. 2, the impact absorbing bracket 20 supports the inner side vertical wall portion 10B of the front fender panel 10 on the apron upper member 14 by the first supporting leg portions 32 and the second supporting leg portions 34. When a collision body 90 collides from the vehicle upper side with the parting portion 22 between the front fender panel 10 and the hood 16, collision load F is inputted to the impact absorbing bracket 20 via the inner side vertical wall portion 10B of the front fender panel 10, and thereafter, is transmitted to the apron upper member 14. In this process, the energy of the time of the collision is absorbed due to the impact absorbing bracket 20 plastically deforming (being crushed) in the vehicle vertical direction.

Figure 4:
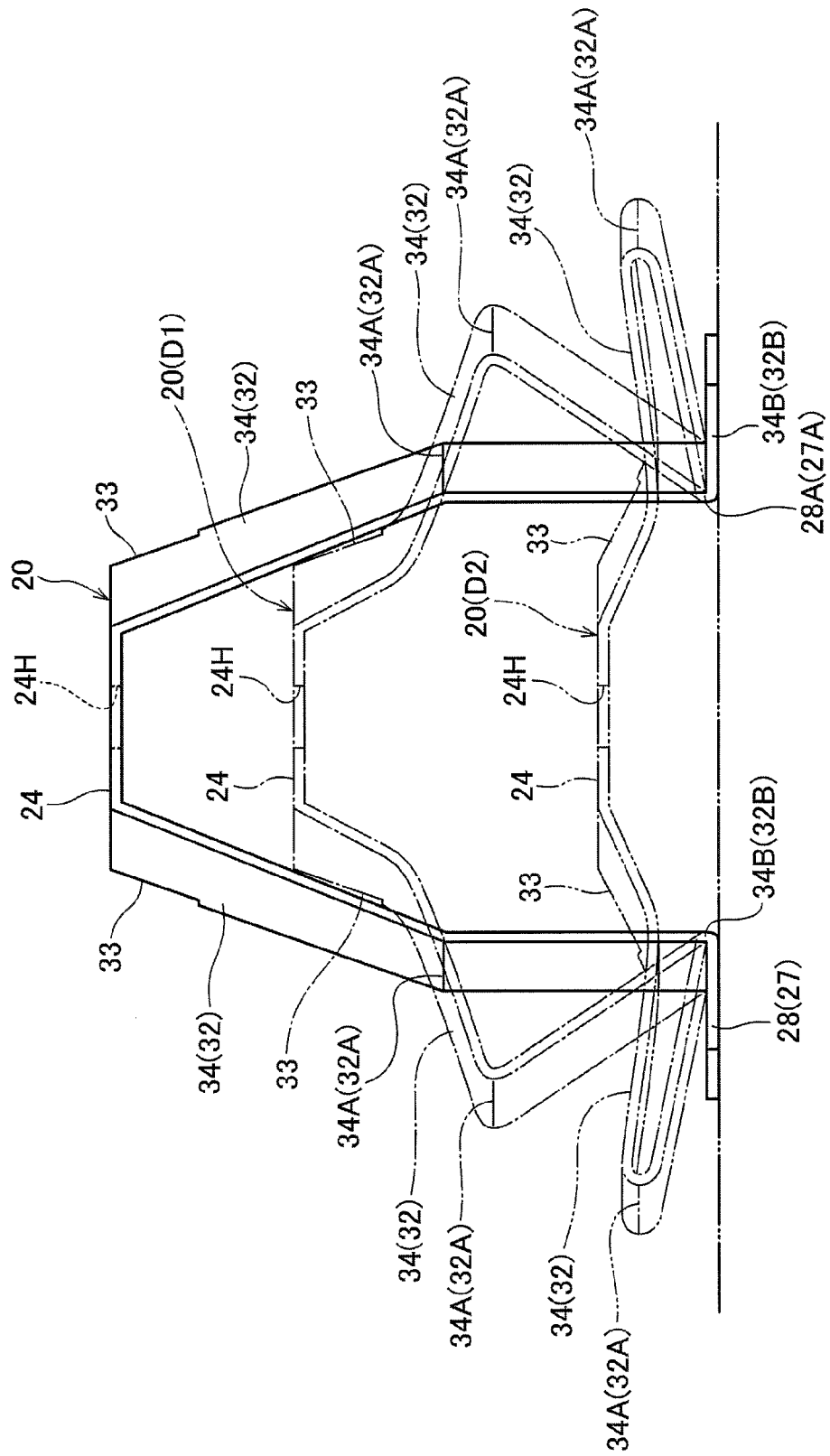
FIG. 4 is a drawing that explains the deformation action of the impact absorbing bracket in the first embodiment of the present invention, and is a drawing seen from the engine room side.

As shown by one-dot chain lines D1 in FIG. 4, the above-described plastic deformation starts with the folded portions 32A, 34A being the starting point. In the present embodiment, the opening portion 38 is formed so as to span between the folded portions 32A, 34A, and the portions of the first supporting leg portion 32 and the second supporting leg portion 34, which portions are adjacent to the opening portion 38, are apart from one another. Therefore, the deformation load of the folded portions 32A, 34A is small, and the deformation of the respective folded portions 32A, 34A can be started smoothly.

The above-described plastic deformation proceeds with the folded portions 32A, 34A and the bent portions 32B, 34B bending such that the fender panel mounting portion 24 approaches the top wall portion 14A of the apron upper member 14, and the impact absorbing bracket 20 is crushed into a substantially flat shape as shown by two-dot chain lines D2. In the present embodiment, the opening portion 38 is formed so as to reach to the portion corresponding to the bent portion 32B and the bent portion 34B, and the apron upper member 14 sides of the first supporting leg portion 32 and the second supporting leg portion 34 are separated. Accordingly, the respective folded portions 32A, 34A, and bent portions 32B, 34B, can be deformed independently, and the deformations of the respective first supporting leg portions 32 and second supporting leg portions 34 proceed without interfering with one another. Due thereto, even if the specifications of the shape of the impact absorbing bracket are changed accompanying the shape designs of front fender panels differing in accordance with vehicle types, a deterioration in the energy absorbing performance (pedestrian protecting performance) can be suppressed while the fitting rigidity is maintained.

Moreover, in the present embodiment, the vehicle body mounting base portion 26 is divided into the first vehicle body mounting base portion 27 and the second vehicle body mounting base portion 28 that are independent of one another. Therefore, the first vehicle body mounting base portion 27 and the second vehicle body mounting base portion 28 can respectively be mounted independently to the top wall portion 14A of the apron upper member 14, and assembly can be carried out easily.

Figure 5:
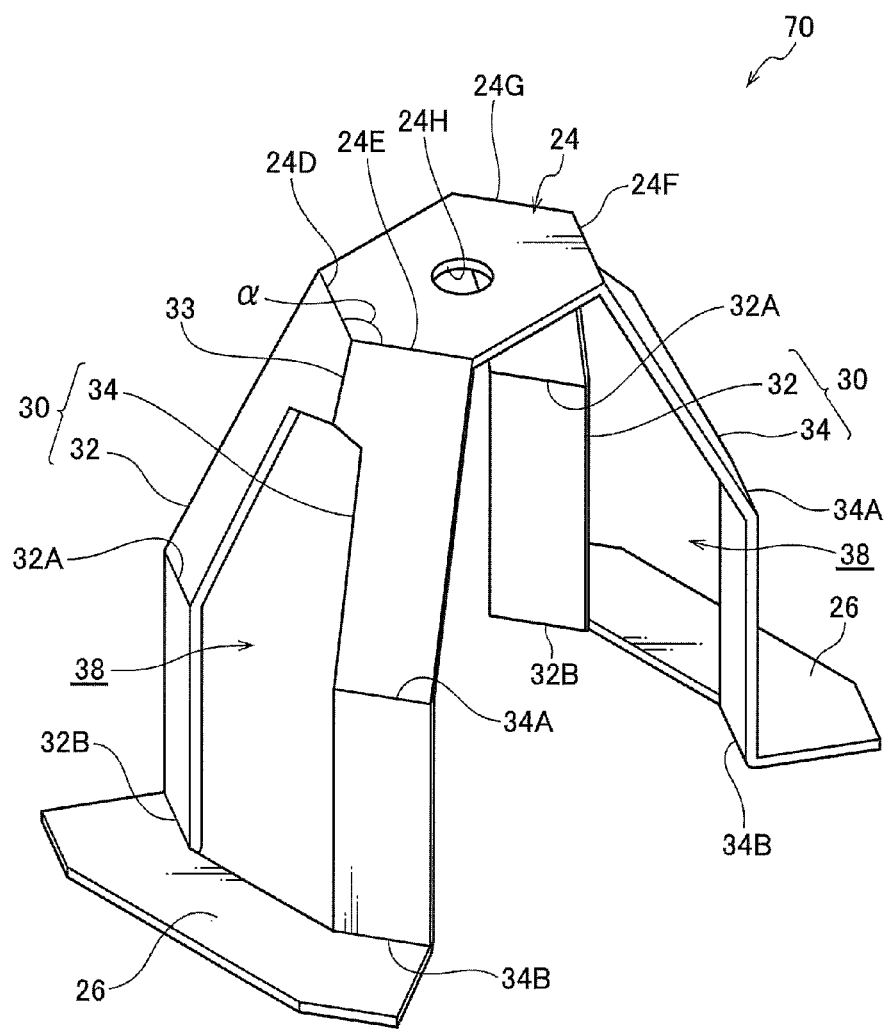
FIG. 5 is a perspective view showing a modified example of the impact absorbing bracket in the first embodiment.

Note that, in the present embodiment, description is given of an example in which the vehicle body mounting base portion 26 is divided into the first vehicle body mounting base portion 27 and the second vehicle body mounting base portion 28 that are respectively independent. However, the vehicle body mounting base portion 26 may be formed integrally such as in an impact absorbing bracket 70 shown in FIG. 5.

Figure 6:
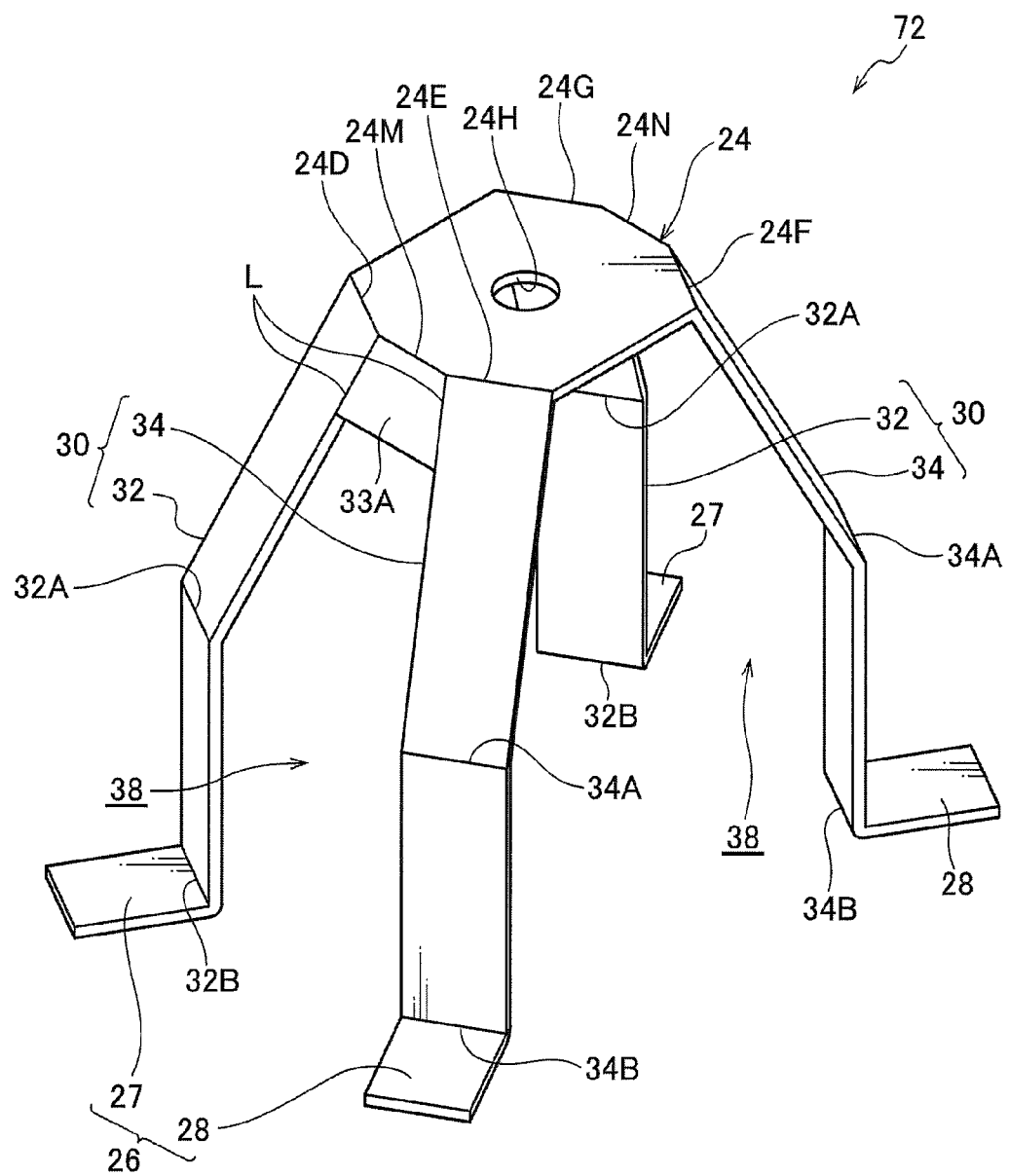
FIG. 6 is a perspective view showing another modified example of the impact absorbing bracket in the first embodiment.

Further, in the present embodiment, description is given of an example in which connecting portion 33 is structured by the fold line in the vertical direction (the vehicle vertical direction) between the first supporting leg portion 32 and the second supporting leg portion 34, but the connecting portion can be made to be another structure. For example, as in an impact absorbing bracket 72 shown in FIG. 6, the connecting portion may be structured by providing a connecting plate 33A integrally between the first supporting leg portion 32 and the second supporting leg portion 34. In this case, the fender panel mounting portion 24 becomes an octagon by adding end sides 24M, 24N for connecting the connecting plates 33A, and fold lines L in the vehicle direction are formed between the first supporting leg portion 32 and the connecting plate 33A, and between the second supporting leg portion 34 and the connecting plate 33A. Further, an angle is formed between the first supporting leg portion 32 and the second supporting leg portion 34 as seen from the vehicle vertical direction.

Figure 7:
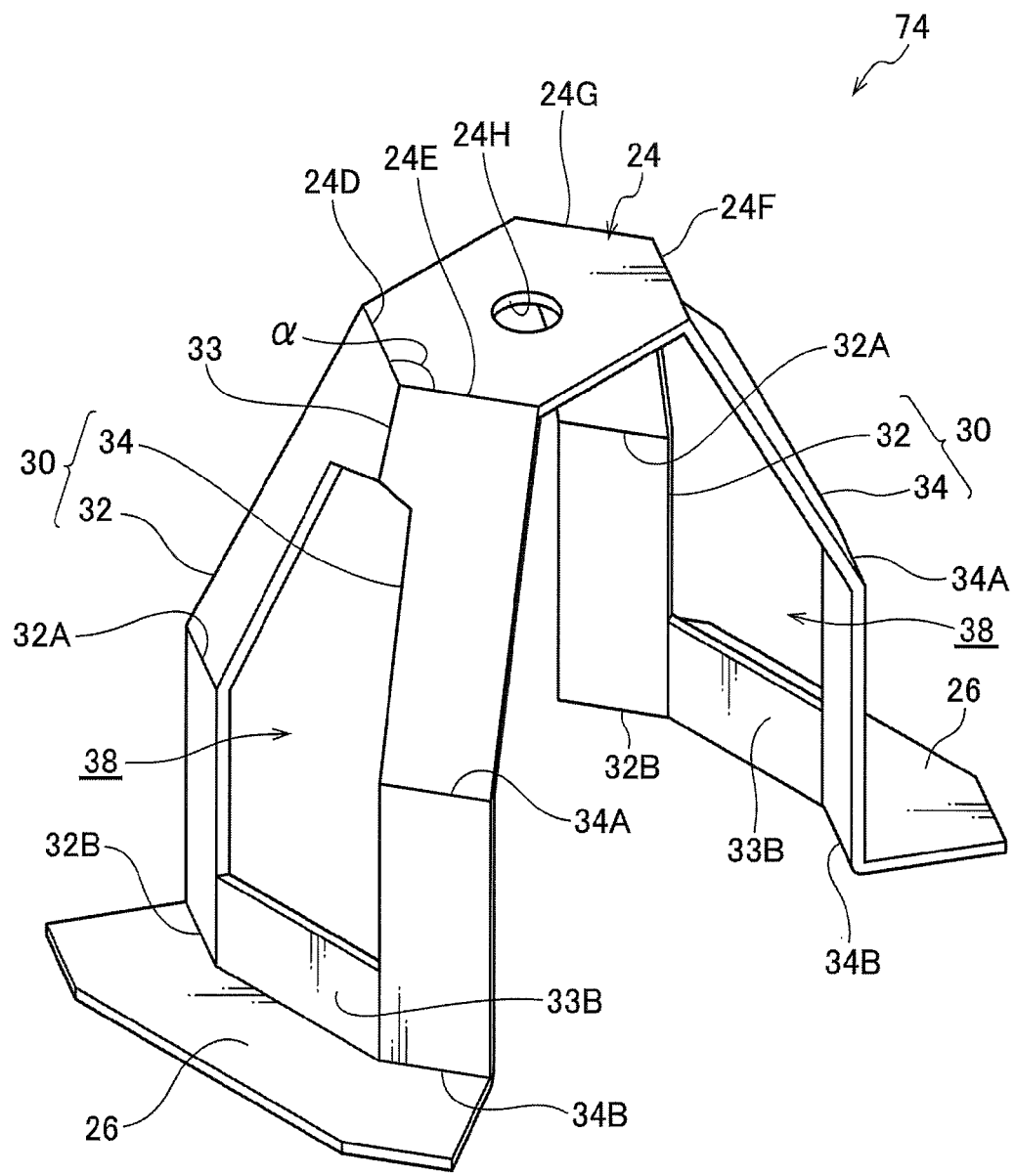
FIG. 7 is a perspective view showing another modified example of the impact absorbing bracket in the first embodiment.

Further, in the present embodiment, the opening portion 38 is formed so as to reach to the portion corresponding to the bent portion 32B and the bent portion 34B. However, as in an impact absorbing bracket 74 shown in FIG. 7, the opening portion 38 can be made to be to the intermediate portions in the height direction of the first supporting leg portion 32 and the second supporting leg portion 34. In this case, a plate-shaped connecting portion 33B, that connects the first supporting leg portion 32 and the second supporting leg portion 34, is formed further toward the lower side than the opening portion 38.

Figure 8:
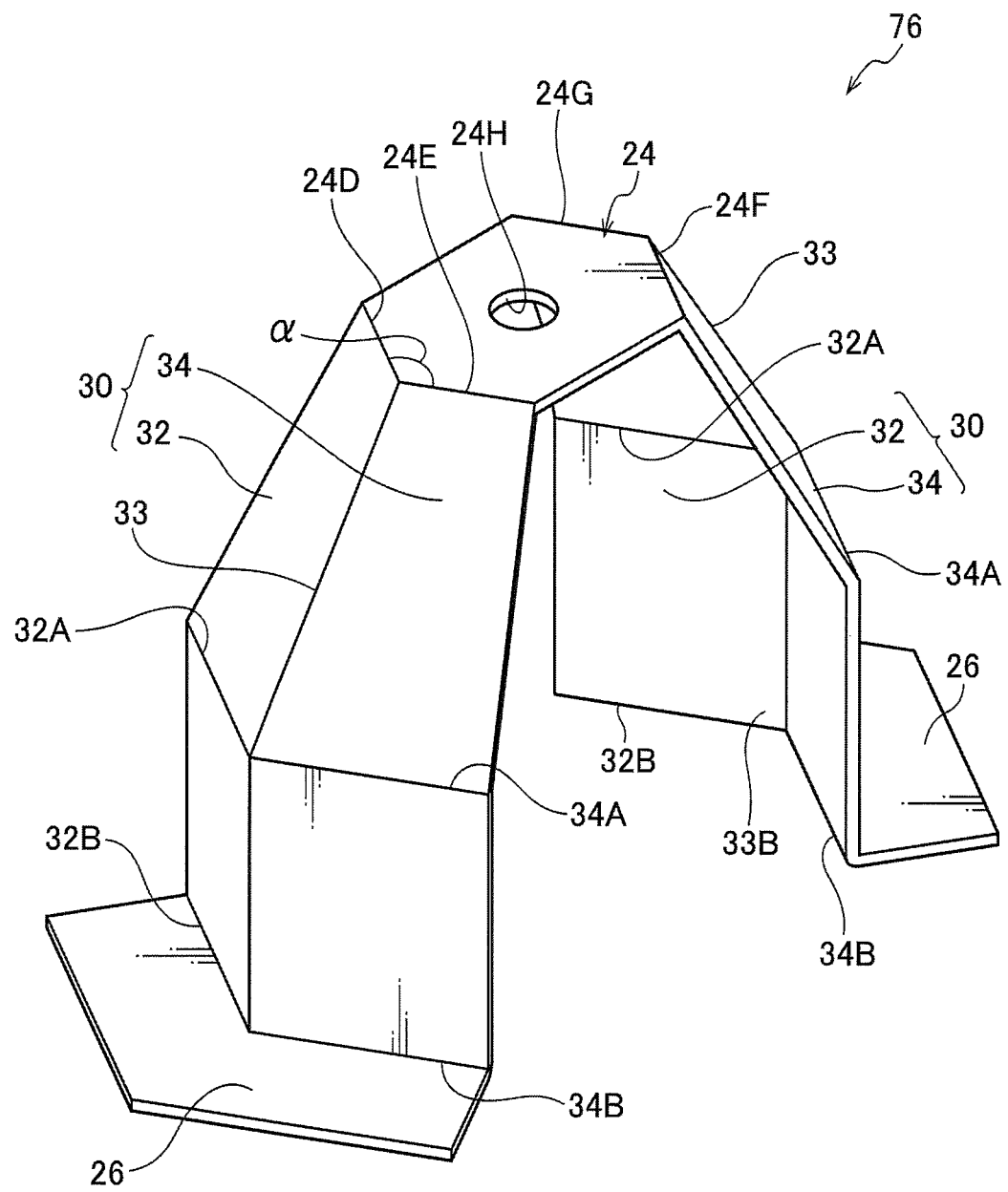
FIG. 8 is a perspective view showing another modified example of the impact absorbing bracket in the first embodiment.

Moreover, as in an impact absorbing bracket 76 shown in FIG. 8, the first supporting leg portion 32 and the second supporting leg portion 34 may be connected at the connecting portion 33 that is structured by a fold line along the entire length in the height direction, without the opening portion 38 being formed.

Figure 9:
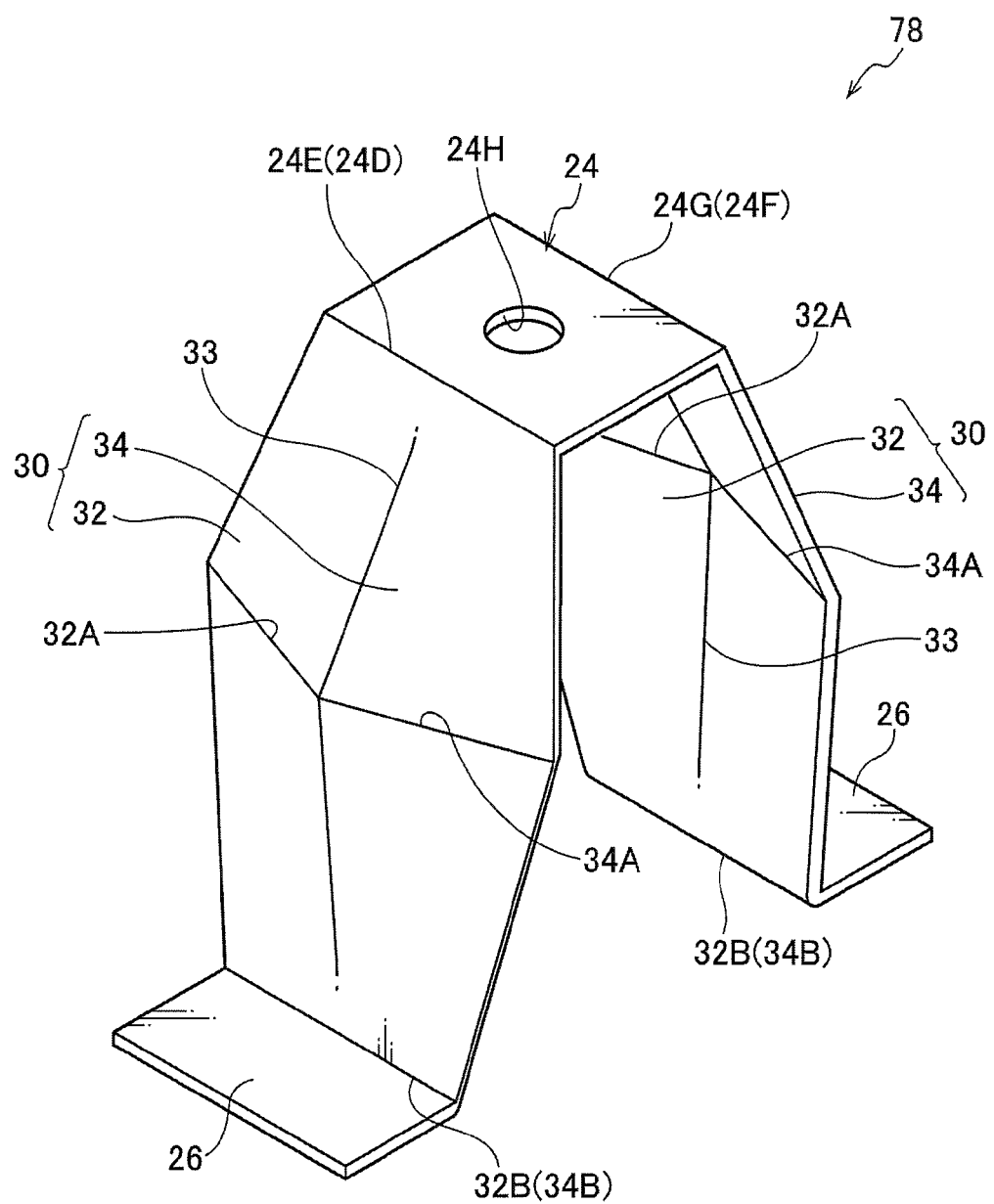
FIG. 9 is a perspective view showing another modified example of the impact absorbing bracket in the first embodiment.

Further, the angle between the first supporting leg portion 32 and the second supporting leg portion 34 as seen from the vehicle vertical direction does not have to be constant, and may vary in the height direction. For example, as in an impact absorbing bracket 78 shown in FIG. 9, at the end portions in the vehicle vertical direction, the first supporting leg portion 32 and the second supporting leg portion 34 are flush, and the angle formed by the first supporting leg portion 32 and the second supporting leg portion 34 (the angle that is formed at the inner side and that is smaller than 180°) can be varied so as to gradually become an acute angle toward the folded portions 32A, 34A. In this case, the end side 24D and the end side 24E, and the end side 24G and the end side 24F, become rectilinear, and the fender panel mounting portion 24 becomes a quadrangular shape.

Figure 10:
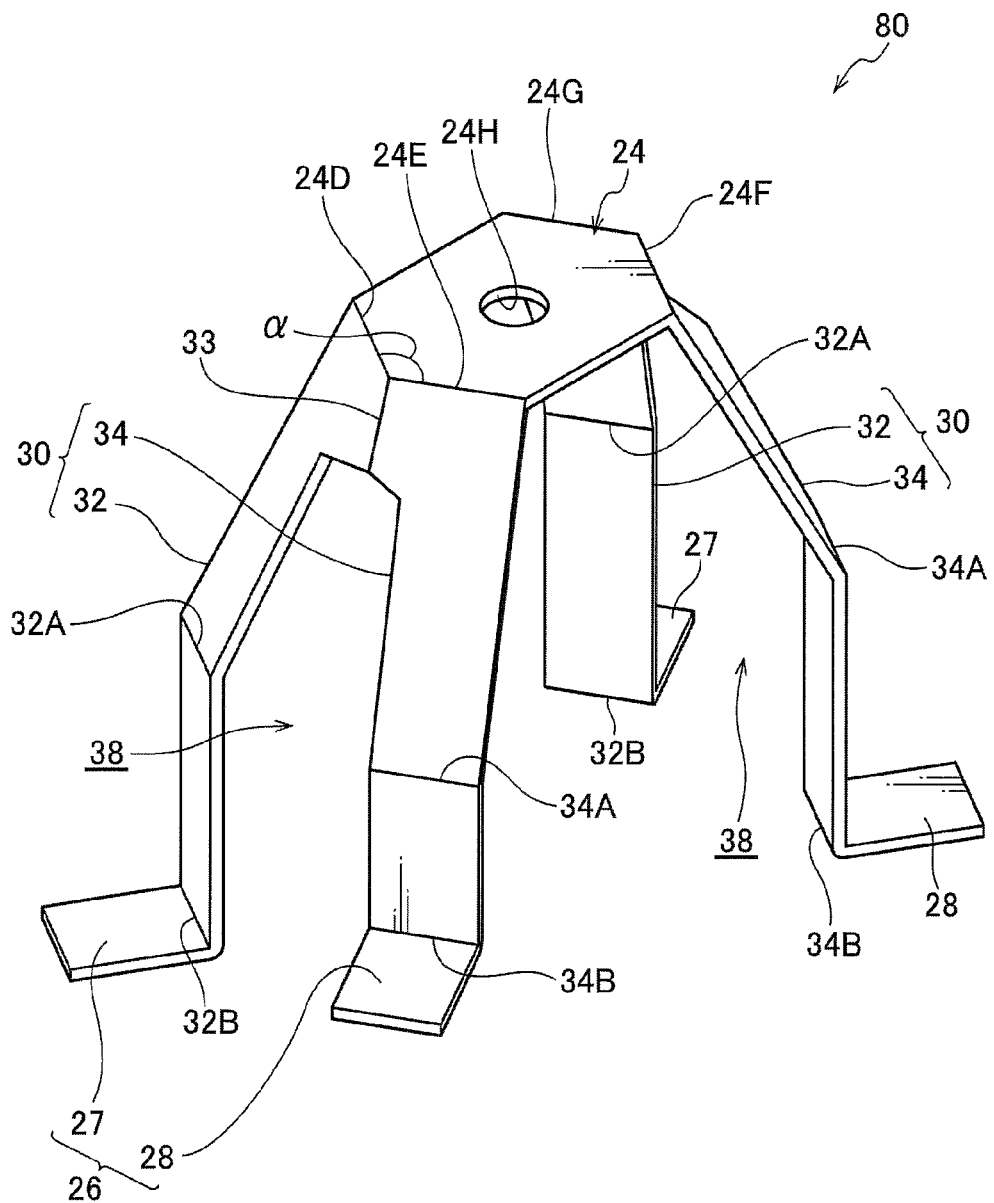
FIG. 10 is a perspective view showing another modified example of the impact absorbing bracket in the first embodiment.

Further, as in an impact absorbing bracket 80 shown in FIG. 10, the respective lengths of the first supporting leg portion 32 and the second supporting leg portion 34 can be changed in accordance with the mounting position (in FIG. 10, only the second supporting leg portion 34 at the near side is short). Note that the respective lengths of the first supporting leg portion 32 and the second supporting leg portion 34 that are extended from the end sides 24D, 24E, and the first supporting leg portion 32 and the second supporting leg portion 34 that are extended from the end sides 24F, 24G, also may be changed.

Figure 11:
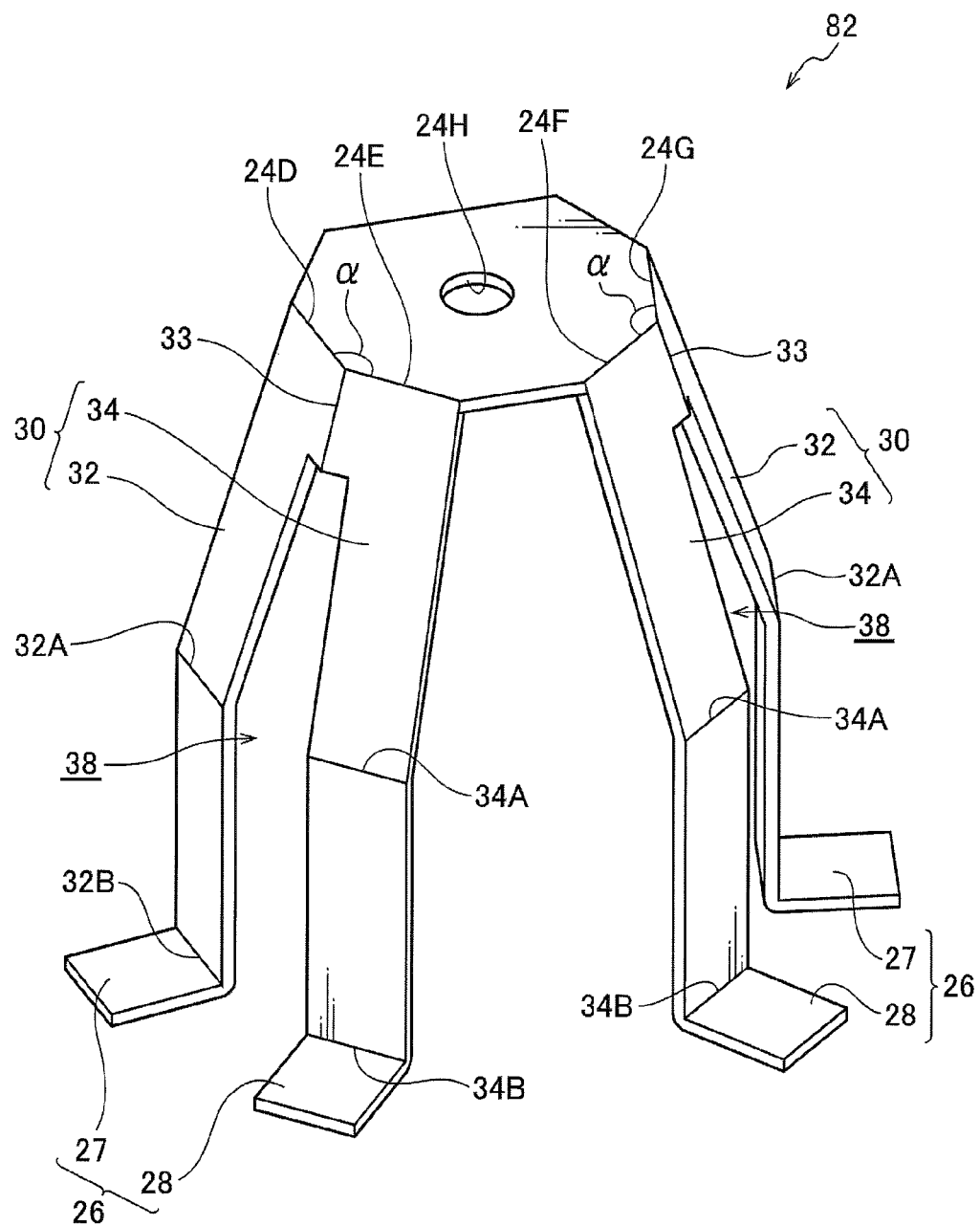
FIG. 11 is a perspective view showing another modified example of the impact absorbing bracket in the first embodiment.

Further, in the present embodiment, the one pair of the supporting leg portions 30 and the other pair of the supporting leg portions 30 are disposed so as to be symmetrical in the longitudinal direction across the fender panel mounting portion 24. However, the pairs of supporting leg portions 30 do not necessarily have to be disposed so as to be symmetrical. As in an impact absorbing bracket 82 shown in FIG. 11, the pairs of supporting leg portions 30 can be set in an asymmetrical arrangement in accordance with the shape of the front fender panel 10 or the mounting portion at the vehicle body side (the apron anchor member 14).

Figure 12:
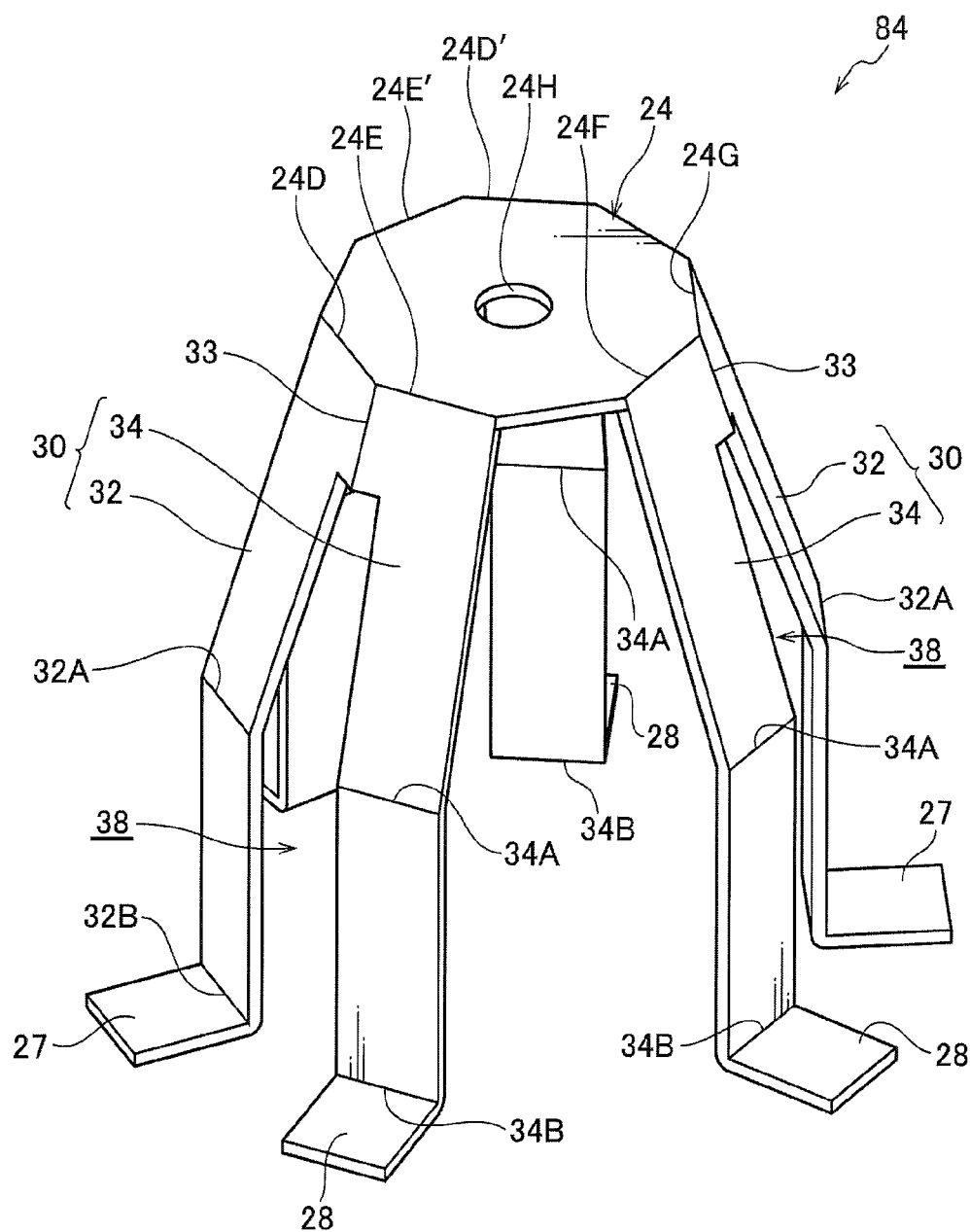
FIG. 12 is a perspective view showing another modified example of the impact absorbing bracket in the first embodiment.

Further, in the present embodiment, there are provided two sets of the members from the first supporting leg portions 32 to the first vehicle body mounting base portions 27, the second supporting leg portions 34, the second vehicle body mounting base portions 28 and the connecting portions 33. However, three sets may be provided as in an impact absorbing bracket 84 shown in FIG. 12, and moreover, four or more sets may be provided. In this case, the shape of the fender panel mounting portion 24 is varied appropriately so as to ensure the end sides. In FIG. 12, the fender panel mounting portion 24 is an octagonal shape.

Figure 13:
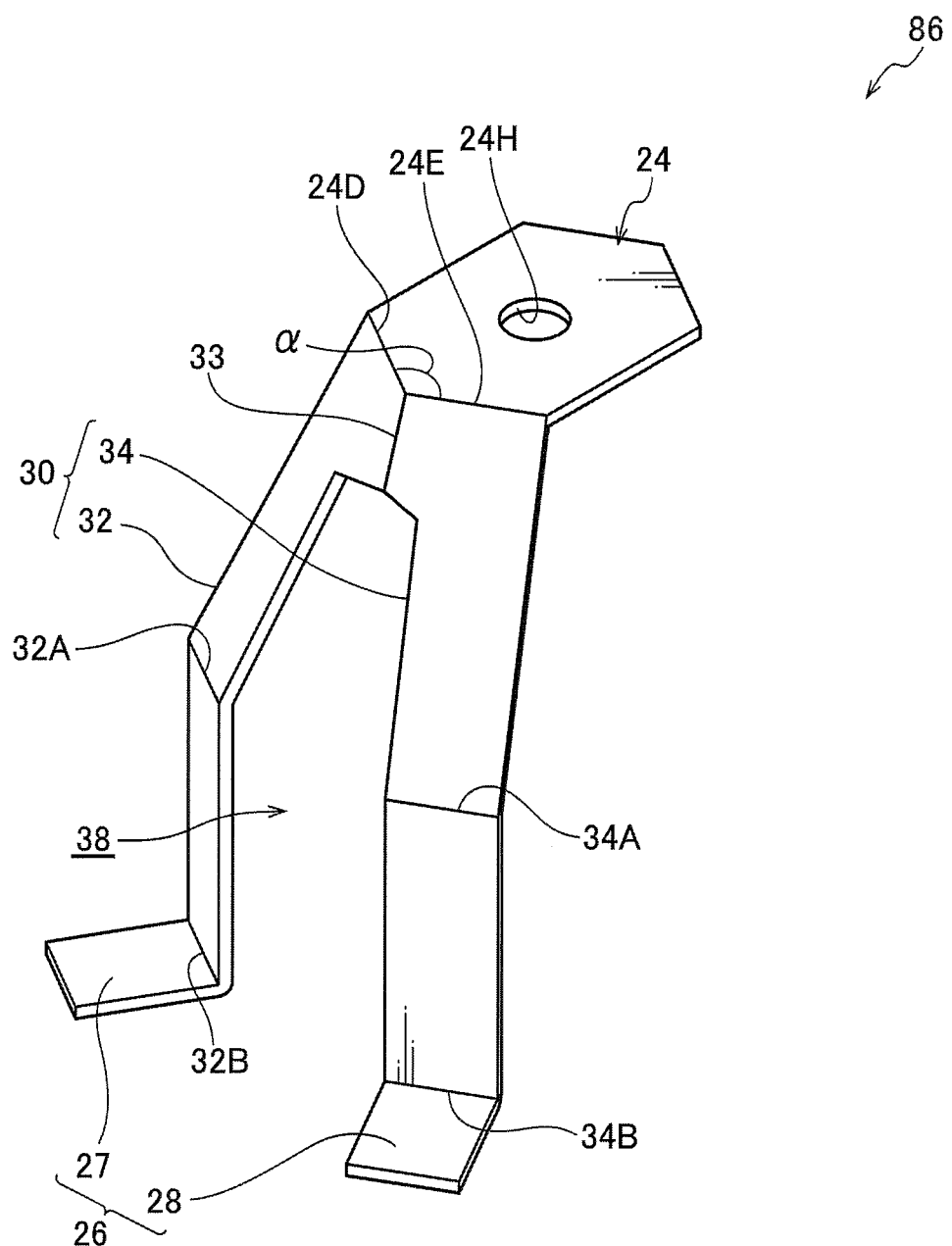
FIG. 13 is a perspective view showing another modified example of the impact absorbing bracket in the first embodiment.

Further, as in an impact absorbing bracket 86 shown in FIG. 13, it is also possible to use only one set of the members from the first supporting leg portion 32 to the first vehicle body mounting base portion 27, the second supporting leg portion 34, the second vehicle body mounting base portion 28 and the connecting portion 33, and to connect the set of members to the fender panel mounting portion 24 in a cantilevered state.

Figure 14:
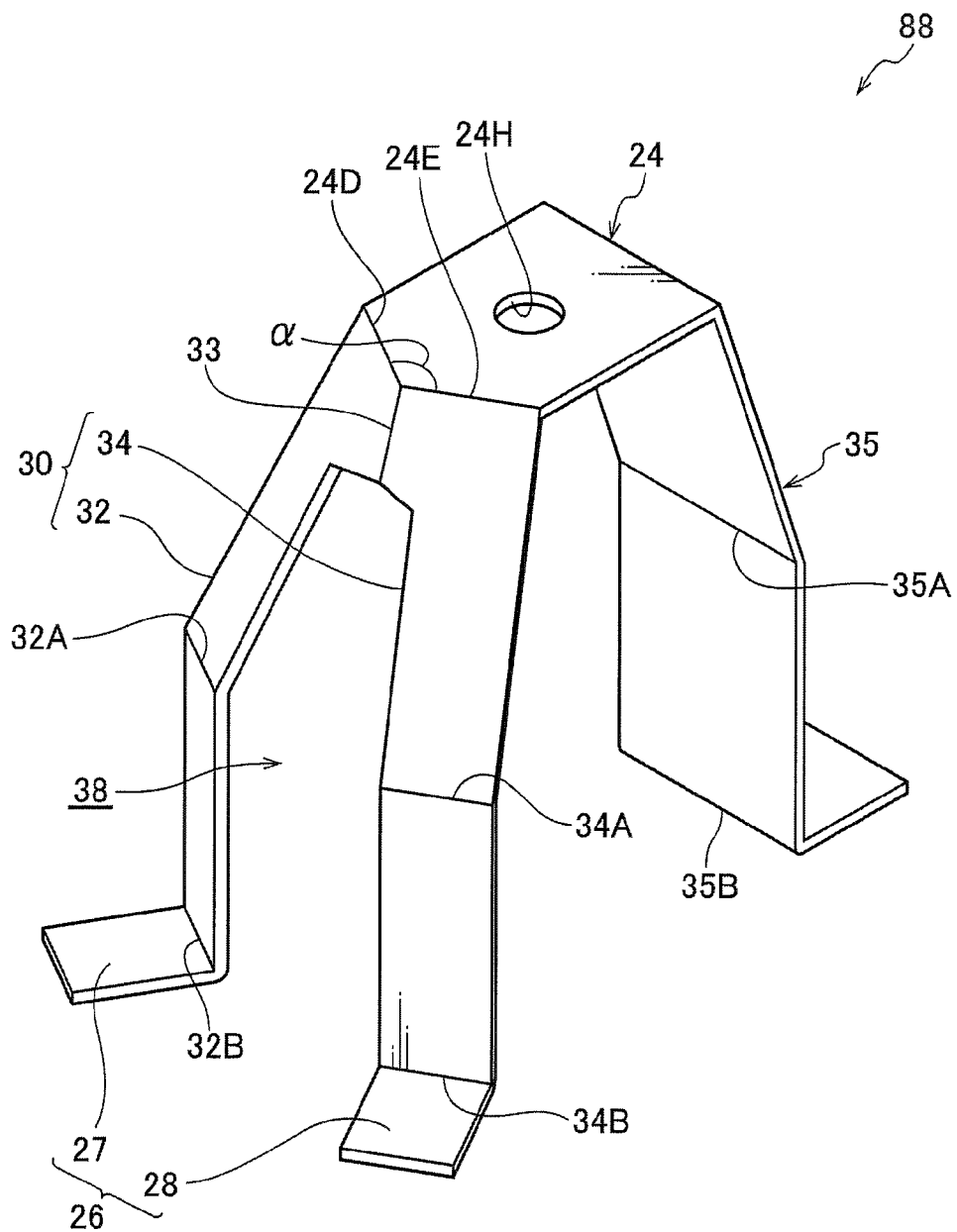
FIG. 14 is a perspective view showing another modified example of the impact absorbing bracket in the first embodiment.

Further, in the present embodiment, the two sets of members from the first supporting leg portions 32 to the first vehicle body mounting base portions 27, the second supporting leg portions 34, the second vehicle body mounting base portions 28 and the connecting portions 33, to which the present invention is applied, are provided at positions that are symmetrical across the fender panel mounting portion 24. However, as in an impact absorbing bracket 88 shown in FIG. 14, it is possible to provide only one set of the members from the first supporting leg portion 32 to the first vehicle body mounting base portion 27, the second supporting leg portion 34, the second vehicle body mounting base portion 28 and the connecting portion 33, to which the present invention is applied, and to provide a supporting leg portion 35, at which the one supporting leg portion 32 and the second supporting leg portion are flush and at which a folded portion 35A and a bent portion 35B are formed, at a position that is symmetric across the fender panel mounting portion 24.

Second Embodiment

A second embodiment of the fender panel mounting structure relating to the present invention is described next by using FIG. 15 and FIG. 16. Note that structural portions that are the same as the above-described first embodiment are denoted by the same reference numerals, and description thereof is omitted.

Figure 15:
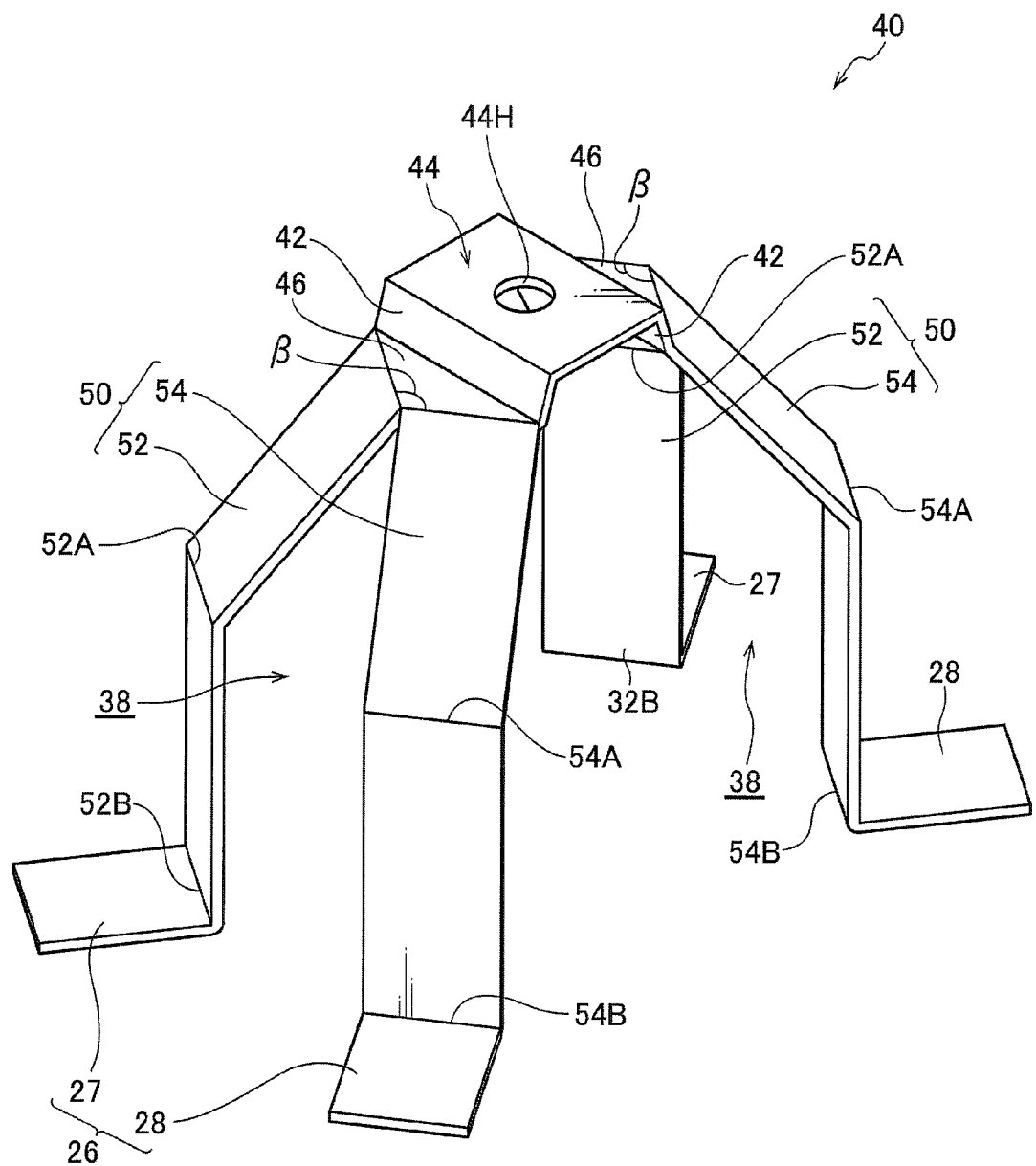
FIG. 15 is a perspective view showing an impact absorbing bracket in a second embodiment of the present invention.
Figure 16:
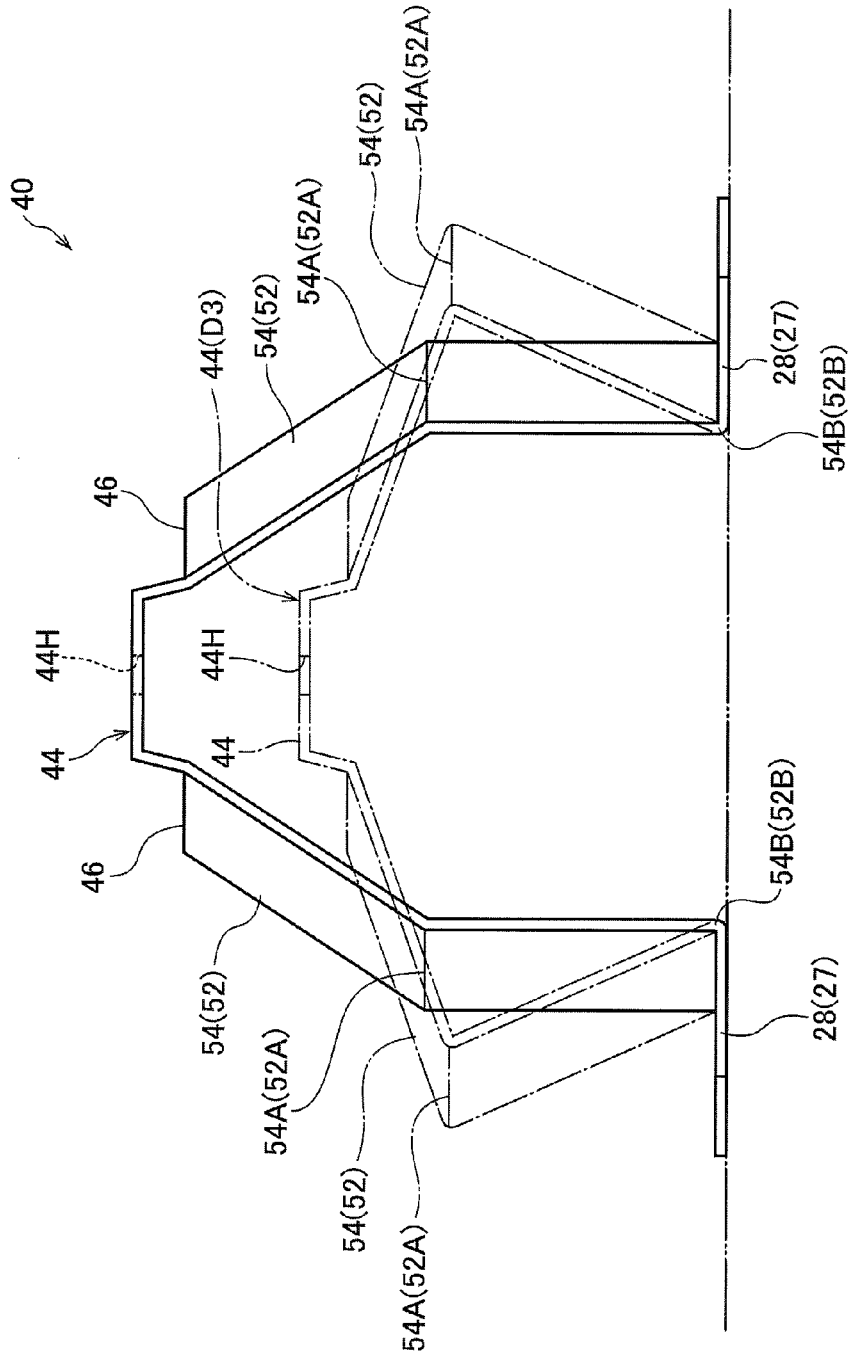
FIG. 16 is a drawing that explains the deformation action of the impact absorbing bracket in the second embodiment of the present invention, and is a drawing seen from the engine room side.

As shown in FIG. 15, the vehicle fender panel mounting structure relating to the second embodiment has the feature in the point that hanging-down portions 42, that are bent toward the vehicle lower side from a fender panel mounting portion 44 of an impact absorbing bracket 40, are formed.

The fender panel mounting portion 44 of the impact absorbing bracket 40 is made into a quadrangular plate shape, and a bolt insert-through hole 44H is formed in the central portion thereof. The fender panel mounting portion 44 is disposed parallel to the top wall portion 14A of the apron upper member 14, and the inner side vertical wall portion 10B of the front fender panel 10 is mounted to the upper surface.

The hanging-down portions 42 are extended from two opposing sides of the fender panel mounting portion 44. The hanging-down portions 42 are formed by being bent toward the lower side from the fender panel mounting portion 44, respectively.

A connecting plate portion 46 serving as a connecting portion is extended integrally from the lower end of each of the hanging-down portions 42. The connecting plate portion 46 is structured by being folded so as to be bent in the direction opposite the bending direction of the folded-over portion between the fender panel mounting portion 44 and the hanging-down portion 42. The connecting plate portion 46 is made into a flush triangular shape as seen from above, and one side thereof is connected to the hanging-down portion 42. A first supporting leg portion 52 and a second supporting leg portion 54 are extended from the other two sides of the connecting plate portion 46. In the present embodiment, a pair of supporting leg portions 50 is structured by the first supporting leg portion 52 and the second supporting leg portion 54.

The first supporting leg portion 52 is extended toward the top wall portion 14A side of the apron upper member 14 integrally from one side among the other two sides of the connecting plate portion 46. A folded portion 52A is formed at the intermediate portion in the height direction of the first supporting leg portion 52. The folded portion 52A is formed by folding the first supporting leg portion 52 from one end of the first supporting leg portion 52 to the other end as seen from the vehicle vertical direction, such that the first supporting leg portion 52 becomes convex in a direction of moving away from the fender panel mounting portion 44.

The second supporting leg portion 54, that serves as the other supporting leg portion of the pair of supporting leg portions, is extended toward the top wall portion 14A side of the apron upper member 14 integrally from the other side among the other two sides of the connecting plate portion 46. A folded portion 54A is formed at the intermediate portion in the height direction of the second supporting leg portion 54. The folded portion 54A is formed by folding the second supporting leg portion 54 from one end of the second supporting leg portion 54 to the other end as seen from the vehicle vertical direction, such that the second supporting leg portion 54 becomes convex in a direction of moving away from the fender panel mounting portion 44.

The first supporting leg portion 52 and the second supporting leg portion 52 are connected via the connecting plate portion 46. Further, an angle β formed by the first supporting leg portion 52 and the second supporting leg portion 54 can be set within the range of 90°≤β<180°.

The opening portion 38 is formed at the vehicle lower side from the connecting plate portion 46, between the first supporting leg portion 52 and the second supporting leg portion 54. Further, the first vehicle body mounting base portion 27 is connected to the vehicle lower side distal end of the first supporting leg portion 52, and the second vehicle body mounting base portion 28 is connected to the vehicle lower side distal end of the second supporting leg portion 54. The structures of the opening portion 38, the first vehicle body mounting base portion 27 and the second vehicle body mounting base portion 28 are similar to the first embodiment. A bent portion 52B is formed between the first supporting leg portion 52 and the first vehicle body mounting base portion 27. A bent portion 54B is formed between the second supporting leg portion 54 and the second vehicle body mounting base portion 28.

The members from the connecting plate portion 46 to the first supporting leg portion 52, the first vehicle body mounting base portion 27, the second supporting leg portion 54 and the second vehicle body mounting base portion 28, that are extended from the one hanging-down portion 42, and the aforementioned members that are connected to the other hanging-down portion 42, are symmetrical at the front and rear across the fender panel mounting portion 44, and are disposed in a substantial V-shape as seen from the vehicle side surface (so as to extend in directions of separating from one another toward the vehicle lower side).

The impact absorbing bracket 40 is made of metal, and the fender panel mounting portion 44, the first supporting leg portions 52, the second supporting leg portions 54, the connecting plate portions 46, the first vehicle body mounting base portions 27 and the second vehicle body mounting base portions 28 can be formed integrally from a single plate by press working. Note that the impact absorbing bracket 40 also may be structured by a method other than press working, for example, by bending punched-out plates and connecting them by welding or the like.

Operation and effects of the above-described embodiment are described next.

In the same way as in the first embodiment, when the collision body 90 collides from the vehicle upper side with the parting portion 22 between the front fender panel 10 and the hood 16, the collision load F is inputted to the impact absorbing bracket 40 via the inner side vertical wall portion 10B of the front fender panel 10, and thereafter, is transmitted to the apron upper member 14. In this process, the energy of the time of the collision is absorbed due to the impact absorbing bracket 40 plastically deforming (being crushed) in the vehicle vertical direction.

In the present embodiment as well, the opening portion 38 is formed so as to span between the folded portions 52A, 54A, and the portions of the first supporting leg portion 52 and the second supporting leg portion 54, which portions are adjacent to the opening portion 38, are apart from one another. Therefore, the deformation load of the respective folded portions 52A, 54A is small, and the deformation can be started smoothly (refer to one-dot chain lines D3 of FIG. 16).

Further, in the present embodiment as well, the opening portion 38 reaches to the portion corresponding to the bent portion 52B and the bent portion 54B, and the apron upper member 14 sides of the first supporting leg portion 52 and the second supporting leg portion 54 are separated. Therefore, the respective folded portions 52A, 54A, and bent portions 52B, 54B, can be deformed independently, and the deformations of the respective first supporting leg portions 52 and second supporting leg portions 54 proceed without interfering with one another. Due thereto, even if the specifications of the shape of the impact absorbing bracket are changed accompanying the shape designs of front fender panels differing in accordance with vehicle types, a deterioration in the energy absorbing performance (pedestrian protecting performance) can be suppressed while the fitting rigidity is maintained.

Figure 17:
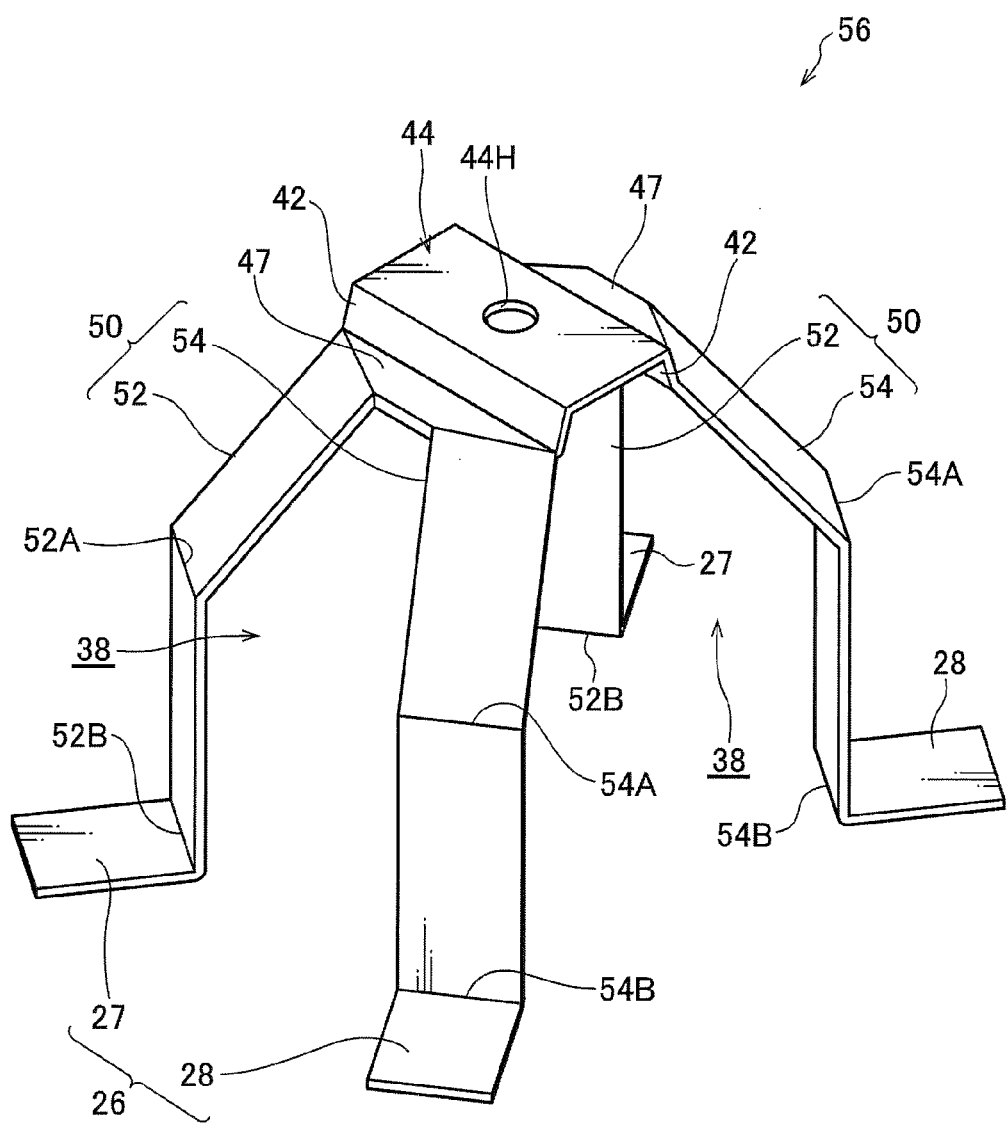
FIG. 17 is a perspective view showing a modified example of the impact absorbing bracket in the second embodiment.

Note that the present embodiment describes, as an example, a case in which the upper surface of the connecting plate portion 46 is a flush structure. However, as in the impact absorbing bracket 56 shown in FIG. 17, the connecting plate portion can be made to be a connecting plate portion 47 that is a polygonal shape (a quadrangular shape in FIG. 17) other than a triangular shape.

Further, with regard to the impact absorbing bracket 40 of the present embodiment as well, the present invention can be implemented in various variations in the same way as in the first embodiment, such as the mounting position of the connecting plate portions 46 with respect to the fender panel mounting portion 44, and the structures of the opening portion 38, the vehicle body mounting base portion 26, the first supporting leg portion 52 and the second supporting leg portion 54, and the like.

The disclosure of Japanese Patent Application No. 2011-152927 is, in its entirety, incorporated by reference into the present Description. All publications, patent applications, and technical standards mentioned in the present Description are incorporated by reference into the present Description to the same extent as if such individual publication, patent application, or technical standard was specifically and individually indicated to be incorporated by reference.

The invention claimed is:

1. A fender panel mounting structure, comprising:
an upper portion inner side end portion of a fender panel that is disposed at a vehicle body front portion side surface;
a vehicle body side structural member that is disposed further toward a vehicle lower side than the upper portion inner side end portion of the fender panel, and that is a mounting mate of the fender panel; and
an impact absorbing bracket having a fender panel mounting portion at which the upper portion inner side end portion is mounted, a vehicle body mounting base portion that is mounted at the vehicle body side structural member, a pair of supporting leg portions that are plate-shaped, and that connect the fender panel mounting portion and the vehicle body mounting base portion in a vehicle vertical direction, and at which are formed folded portions that are folded over from one end to another end at height direction intermediate portions of the respective supporting leg portions, and that are disposed such that plate surfaces thereof form an angle as seen from the vehicle vertical direction, and a connecting portion that connects the pair of supporting leg portions to one another further toward a vehicle lower side than the fender panel mounting portion, the impact absorbing bracket deforming and absorbing energy due to an input of collision load from a vehicle upper side.

2. The fender panel mounting structure of claim 1, wherein an opening portion, that spans between the folded portions in the vehicle vertical direction, is formed between the pair of supporting leg portions.

3. The fender panel mounting structure of claim 2, wherein the vehicle body mounting base portion is structured by end portions, at a side opposite the fender panel mounting portion, of the pair of supporting leg portions being extended while being bent, and the opening portion is extended so as to span between the bent portions that are bent.

4. The fender panel mounting structure of claim 1, wherein the vehicle body mounting base portion is divided by the opening portion into a portion that is extended from one of the pair of supporting leg portions and a portion that is extended from another.

5. The fender panel mounting structure of claim 1, wherein the fender panel mounting portion is hexagonal plate shaped, and the pair of supporting leg portions are connected to two adjacent sides thereof.

6. The fender panel mounting structure of claim 2, wherein the vehicle body mounting base portion is divided by the opening portion into a portion that is extended from one of the pair of supporting leg portions and a portion that is extended from another.

7. The fender panel mounting structure of claim 3, wherein the vehicle body mounting base portion is divided by the opening portion into a portion that is extended from one of the pair of supporting leg portions and a portion that is extended from another.

8. The fender panel mounting structure of claim 2, wherein the fender panel mounting portion is hexagonal plate shaped, and the pair of supporting leg portions are connected to two adjacent sides thereof.

9. The fender panel mounting structure of claim 3, wherein the fender panel mounting portion is hexagonal plate shaped, and the pair of supporting leg portions are connected to two adjacent sides thereof.

10. The fender panel mounting structure of claim 4, wherein the fender panel mounting portion is hexagonal plate shaped, and the pair of supporting leg portions are connected to two adjacent sides thereof.

11. The fender panel mounting structure of claim 7, wherein the fender panel mounting portion is hexagonal plate shaped, and the pair of supporting leg portions are connected to two adjacent sides thereof.

* * * * *